United States Patent [19]

Jackson et al.

[11] Patent Number: 5,373,934
[45] Date of Patent: Dec. 20, 1994

[54] BOTTLE-GRIPPING INSERT ELEMENT

[75] Inventors: James R. Jackson, Hagerstown; Gerald E. Stelle, Richmond; Edgar E. Adams, Ft. City, all of Ind.

[73] Assignee: Aluminum Company of America, Pittsburgh, Pa.

[21] Appl. No.: 165,371

[22] Filed: Dec. 10, 1993

[51] Int. Cl.$^5$ .............................................. B65G 47/84
[52] U.S. Cl. ................................. 198/803.8; 198/480.1
[58] Field of Search .......... 198/803.8, 803.14, 803.15, 198/441, 480.1, 481.1, 612, 613

[56] References Cited

U.S. PATENT DOCUMENTS

| | | | |
|---|---|---|---|
| 614,689 | 11/1898 | Beauregard et al. | 198/803.8 X |
| 1,825,751 | 10/1931 | Meyer et al. | 198/480.1 |
| 2,500,465 | 3/1950 | Meyer | 198/480.1 X |
| 2,653,083 | 9/1953 | Wanzer et al. | 198/803.8 X |
| 3,760,561 | 9/1973 | Over et al. | 53/201 |
| 3,866,737 | 2/1975 | Simon | 198/803.8 X |
| 4,075,086 | 2/1978 | Marsh, III et al. | 198/480.1 X |
| 4,084,686 | 4/1978 | Calhoun | 198/481.1 X |
| 4,168,773 | 9/1979 | Thiel et al. | 198/803.8 X |
| 4,200,183 | 4/1980 | Riggs | 198/803.14 X |
| 4,277,928 | 7/1981 | Ahlers | 53/67 |
| 4,308,707 | 1/1982 | Willingham | 53/314 |
| 4,361,173 | 11/1982 | Storimans | 198/803.8 X |
| 4,624,098 | 11/1986 | Trendel | 198/480.1 X |
| 4,663,913 | 5/1987 | Trendell | 53/314 |
| 5,029,695 | 7/1991 | Kovara | 198/480.1 X |

FOREIGN PATENT DOCUMENTS 2052717 5/1971 Germany .......................... 198/481.1

Primary Examiner—James R. Bidwell
Attorney, Agent, or Firm—Dressler, Goldsmith, Shore & Milnamow, Ltd.

[57] ABSTRACT

A bottle-gripping insert element is configured for detachable mounting in respective association with a bottle-receiving pocket of a star wheel of a bottle-handling apparatus. The insert element is formed from elastomeric material, and is dimensioned for interfering engagement with associated bottles dimensioned in accordance with normal manufacturing tolerances. The bottle-gripping insert element is preferably provided with a plurality of generally vertically extending gripping ribs for enhanced frictional engagement with associated bottles.

9 Claims, 3 Drawing Sheets

BOTTLE-GRIPPING INSERT ELEMENT

TECHNICAL FIELD

The present invention relates generally to container-handling equipment, and more particularly to a bottle-gripping insert element for use with a bottle-handling apparatus, such as a capping machine, with the insert element desirably acting to hold a bottle against rotation about its own axis during capping, while at the same time facilitating efficient replacement of the element attendant to normal wear.

BACKGROUND OF THE INVENTION

Bottle-handling equipment, such as closure-applying capping machines, must be configured for reliable, high-speed handling of bottles or like containers. While the particular configuration of such an apparatus will depend upon the specific bottles being handled, and the specific closures which are being applied thereto, many applications require that each individual bottle be restrained against rotation, about its own vertical axis, during application of an associated closure. Ordinarily this is accomplished by positioning each bottle in a respective pocket at the periphery of a rotatable star wheel of the apparatus, with the star wheel including an arrangement whereby the bottle is restrained against rotation. As the bottle is moved by the star wheel, a closure is applied to the bottle, and a capping head of the apparatus rotates the closure (while the bottle is held against rotation) for application to the bottle. The bottle is typically subsequently transferred to an output star wheel of the apparatus for subsequent handling, packaging, storage, and shipment.

In order to restrain each bottle against rotation as a closure is applied thereto, current capping machines are typically provided with a flexible belt which extends generally about the bottle-receiving star wheel of the capping machine. This belt, typically formed from suitable elastomeric material, is positioned so that a portion of the belt extends within each of the pockets defined by the periphery of the star wheel. Thus, as a bottle is moved into one of the pockets, it engages and displaces the segment of the belt extending within that pocket, thereby providing the desired restraint against rotation of the bottle as it is frictionally strained by the belt.

While the above-described arrangement for restraining bottles is widely employed, experience has shown that the bottle-engaging belt does not always restrain bottles against rotation as desired. Because such belts are subject to stretching, attendant to deflection by the bottles received in the star wheel, periodic adjustment of the belt tension is required. Additionally, the rate at which such stretching occurs can vary, thus undesirably resulting in inconsistent frictional forces between the flexible belt and the associated bottles. The inevitable build-up on the flexible belt of product being placed in the containers further contributes to inconsistent frictional forces, including undesired slippage of the bottles relative to the belt. Replacement of the belt attendant to wear or breakage has proven to be undesirably time-consuming, detracting from machine productivity by the required "down time" for belt replacement.

The present invention contemplates an arrangement for gripping bottles or other containers in a bottle-handling apparatus which promotes consistent, reliable handling of the bottles, while facilitating efficient maintenance attendant to normal wear.

SUMMARY OF THE INVENTION

A bottle-gripping insert element configured in accordance with the present invention is particularly suited for use with a high-speed bottle handling apparatus such as a closure-applying capping machine. An insert element in accordance with the present invention is configured for detachable mounting in a respective one of a plurality of pockets defined at the periphery of a rotatable star wheel of the bottle-handling apparatus. In the preferred embodiment, the gripping element includes a plurality of generally vertically extending, spaced-apart gripping ribs which are dimensioned for interfering engagement with associated bottles or other containers, thus desirably firmly gripping each bottle and restraining it against rotation about its own vertical axis.

In accordance with the illustrated embodiment, the present insert element includes an insert body comprising elastomeric material which is positionable in respective association with one of the bottle-receiving pockets of the rotatable star wheel of an associated bottle-handling apparatus. The insert body has a generally T-shaped cross-sectional configuration, and has a generally concave, arcuate bottle-engaging face against which a bottle is urged and restrained against rotation during handling by the apparatus.

The insert element further includes an arrangement to facilitate detachable mounting in the respective one of the bottle-receiving pockets of the associated star wheel. In the illustrated embodiment, the mounting arrangement comprises a pair of mounting ears, each of which defines an opening for respectively receiving an associated mechanical fastener. This desirably straightforward arrangement facilitates efficient replacement of each insert element on the associated star wheel. Individual insert elements can be replaced as required, or all of the insert elements of a star wheel replaced, as may be necessary.

In order to promote the desired frictional engagement with an associated bottle, the bottle-engaging face of the insert element is dimensioned for interfering engagement a bottle positioned thereagainst. In particular, this dimensioning is selected to create the desired interfering engagement with all bottles within specified tolerances.

In the preferred form, the bottle-engaging face of the insert body defines a plurality of generally vertically extending, spaced apart gripping ribs. The gripping ribs have free end portions engageable with a bottle received in the respective one of the pockets, with the free end portions preferably being generally flat surfaced so that each rib defines a "edge" for enhanced grip with the associated bottle. This preferred configuration of spaced-apart ribs facilitates drainage of liquid (such as liquid product) from the face of the insert element, and is believed to desirably avoid "hydroplaning", that is, a loss of friction between the insert element and an associated bottle due to the presence of liquid on its bottle-engaging face.

Other features and advantages of the present invention will become readily apparent from the following detailed description, the accompanying drawings, and the appended claims.

DETAILED DESCRIPTION

Figure 1:
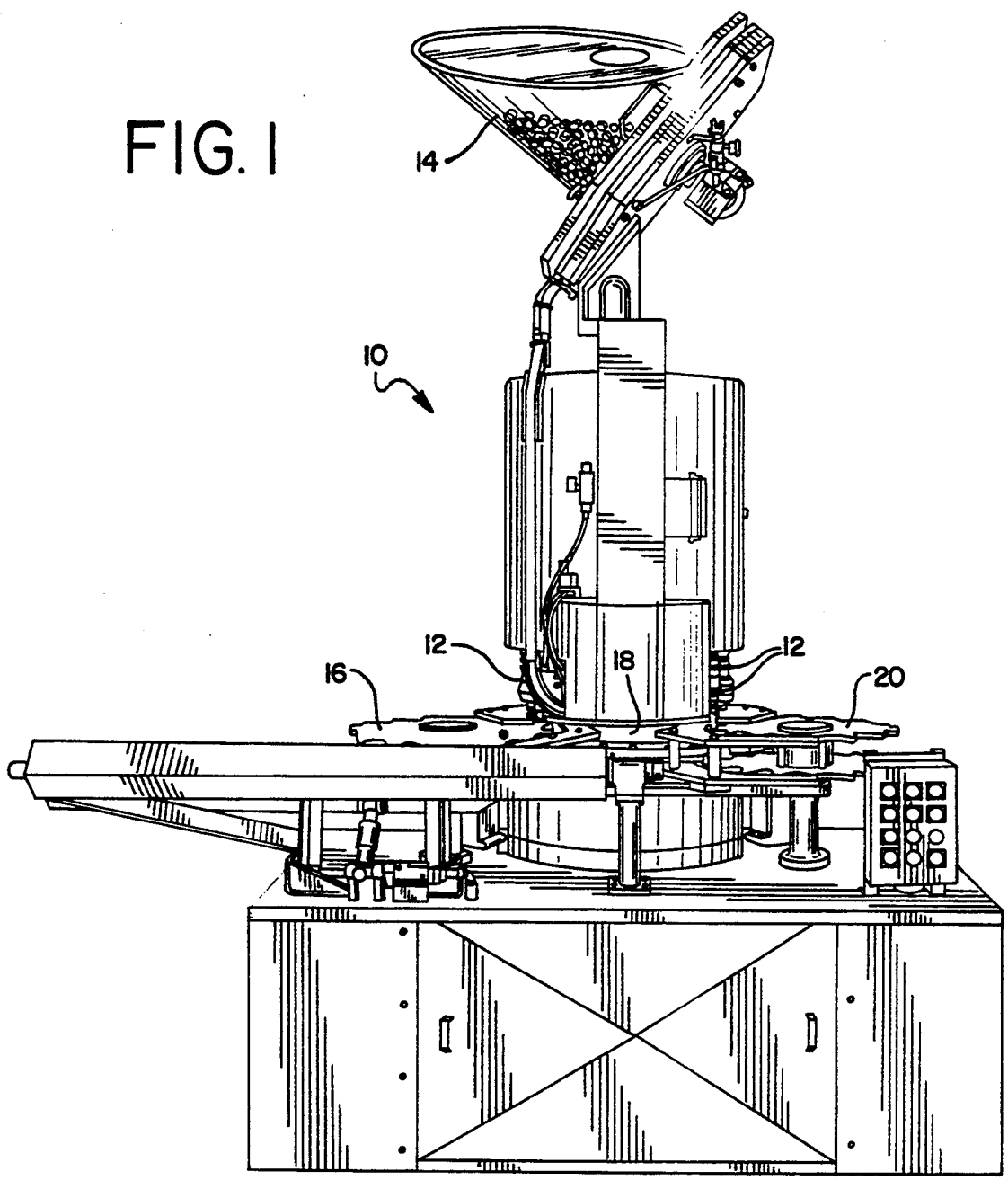
FIG. 1 is a perspective view of a container-handling apparatus, illustrated as a capping machine, with which the present invention is suited for use.

While the present invention is susceptible of embodiment in various forms, there is shown in the drawings and will hereinafter be described a presently preferred embodiment, with the understanding that the present disclosure is to be considered as an exemplification of the invention, and is not intended to limit the invention to the specific embodiment illustrated.

With reference to FIG. 1, therein is illustrated a bottle-handling apparatus 10, illustrated as a closure-applying capping machine, which is illustrative of the type of apparatus with which the present invention is particularly suited for use. As illustrated, the capping machine includes a plurality of rotatable capping heads 12 which receive closures C from an associated feed hopper 14 for respective application to bottles B or other containers. Handling of the containers is effected via rotatable star wheels of the apparatus, including an input star wheel 16, a center star wheel 18 which holds the bottles during closure application, and an output star wheel 20 which guides the sealed containers from the apparatus.

With further reference to the drawings, the center star wheel 18 is illustrated in a typical configuration, including an upper support 22, and a lower support 24. In order to facilitate handling of bottles, the star wheel is configured to define a plurality of circumferentially spaced cavities or pockets at the outer periphery thereof. The pockets, designated 26 as defined by the lower support 24 of the star wheel 18, are configured to respectively receive the bottles B during handling, and in particular, during respective application of closures C thereto. Accordingly, an arrangement must be provided so that each bottle is restrained against rotation about its own vertical axis as the bottles are moved by the star wheel, and closures are applied to the bottles by the capping heads 12. As the bottles are moved in this manner, the bottles are urged against one or more outer guides 28 which act to urge each bottle into a respective one of the pockets 26.

Figure 2:
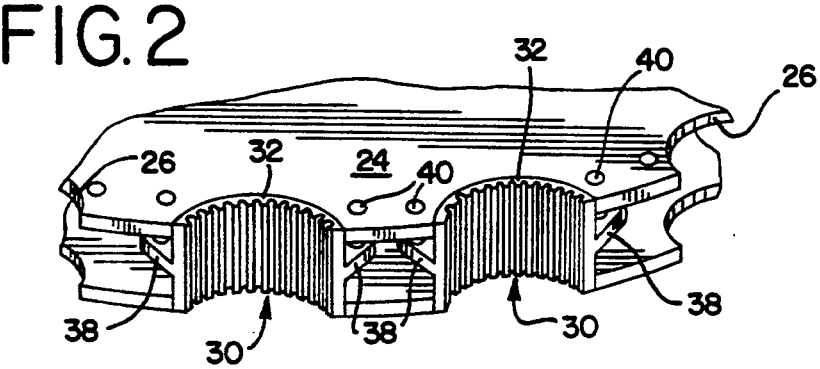
FIG. 2 is a fragmentary perspective view of a portion of a star wheel of the apparatus illustrated in FIG. 1, with selected ones of pockets defined at the periphery of the star wheel element having bottle-gripping insert elements, in accordance with the present invention, positioned therein.
Figure 3:
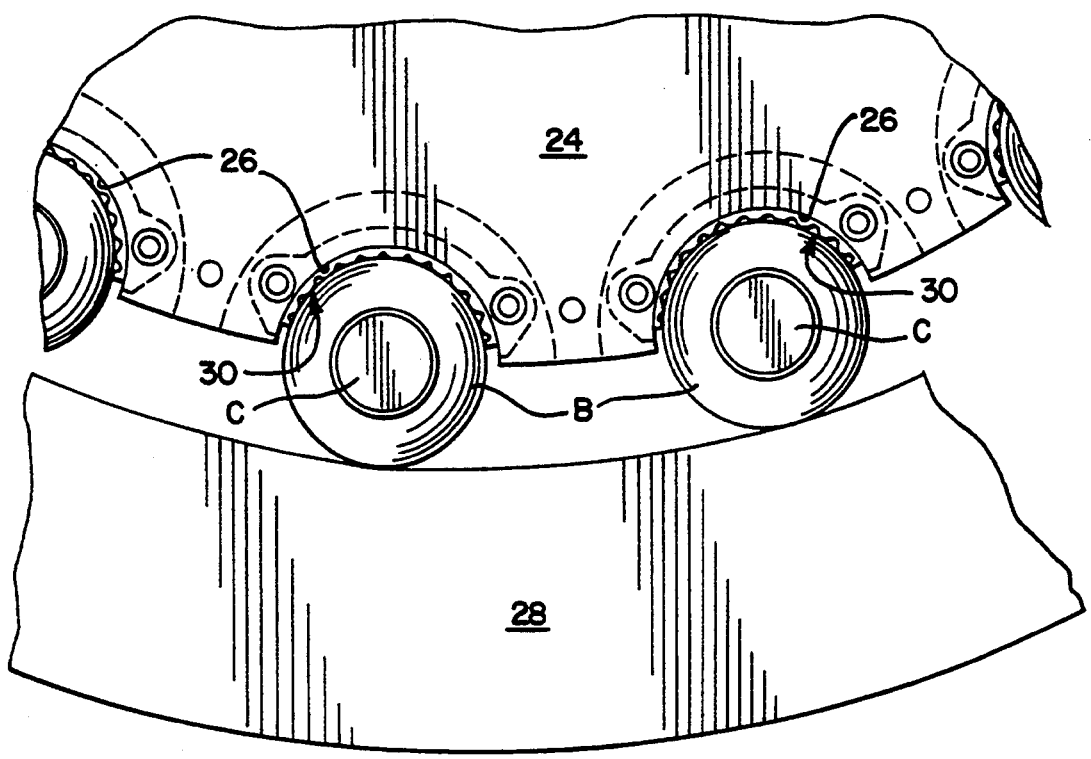
FIG. 3 is a fragmentary, top plan view illustrating disposition of bottles in the pockets of the star wheel element, with insert elements positioned within the pockets for engagement by respective bottles.
Figure 4:
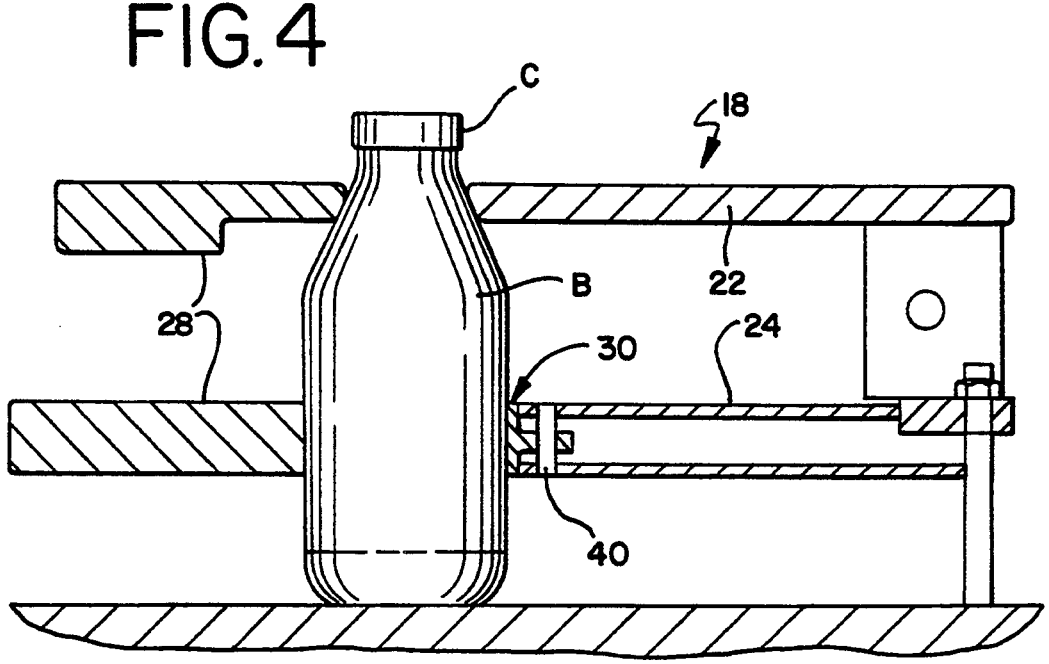
FIG. 4 is a cross-sectional view further illustrating engagement of a bottle with the bottle-gripping insert element of the present invention.
Figure 5:
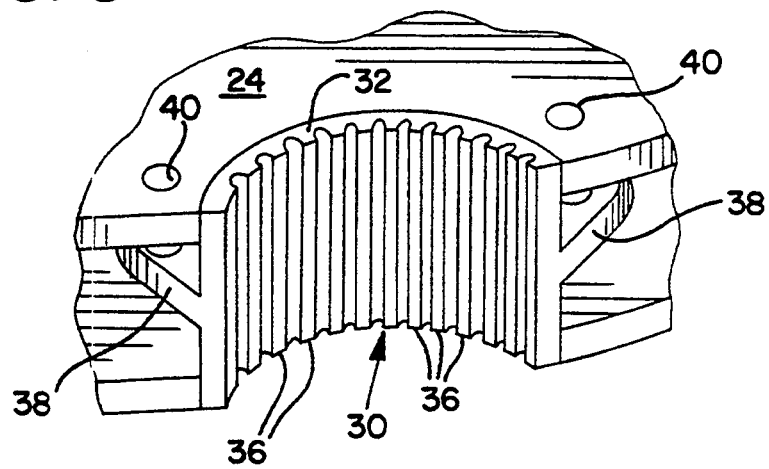
FIG. 5 is an enlarged, fragmentary perspective view further illustrating the present insert element.

In accordance with the present invention, each pocket 26 is provided with a gripping insert element 30 which is specifically configured for frictionally gripping a respective bottle B, and restraining each bottle against rotation about its own axis. As particularly illustrated in FIGS. 2, 5, and 6, each gripping insert element 30 includes a generally elongated, preferably generally arcuate insert body 32, having a generally T-shaped cross-sectional configuration, which defines a generally arcuate concave face against which a bottle is urged as it is received in the associated pocket.

Figure 6:
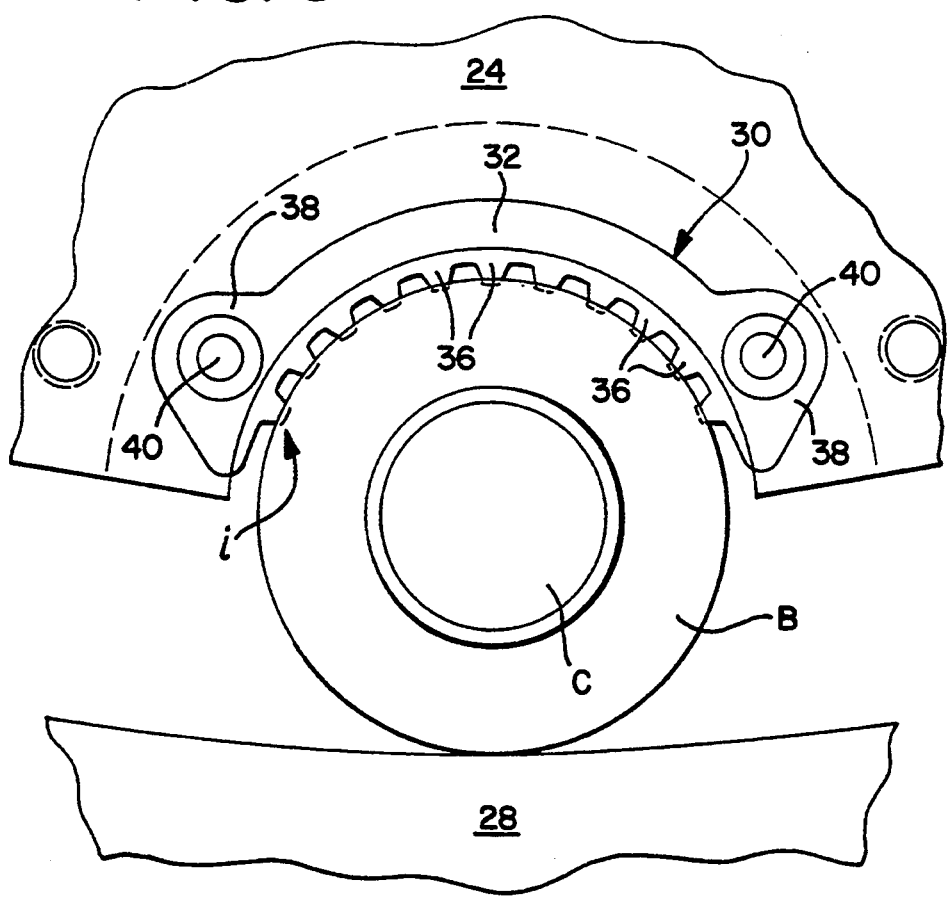
FIG. 6 is a diagrammatic view further illustrating the preferred configuration of the present bottle-gripping insert element, and the manner in which the insert element cooperates with an associated bottle or other container.

As illustrated, the arcuate face of each insert element 30 is preferably provided with a plurality of generally vertically extending, spaced apart gripping ribs 36. Gripping ribs 36 are preferably configured to define generally flat-surfaced free end portions which engage the associated bottle B, and which act to frictionally grip each bottle as it is urged into the pocket by the action of the associated guides 28. As illustrated in FIG. 6, each gripping rib 36 is preferably has a generally truncated conic cross-sectional configuration, thus providing the preferred flat-surfaced free end portion, with the outer edges of each rib desirably providing enhanced gripping engagement with the associated bottles. The grooves thus defined between the ribs desirably facilitate drainage of liquid from the bottle-engaging face of the insert element, avoiding a loss of friction which could otherwise occur.

In order to promote the desired gripping action of each insert element 30 with an associated bottle, the bottle-engaging face of the insert element is dimensioned for interfering engagement with the associated container. To this end, the insert element 30 is formed from elastomeric material so that the gripping ribs 36 are elastically deformed attendant to engagement with an associated bottle. In a current embodiment, each gripping insert element 30 is formed from silicone-based elastomeric material, such as Formula 427, available from Parkway Products, of Cincinnati, Ohio, which exhibits a durometer 35, Shore A.

In a current embodiment, the flat-surfaced free end portions of the gripping ribs 36 are dimensioned to define a circle having a radius of 1.41 inches, which dimensioning provides the desired interfering engagement with bottles having an outside diameter of 2.906±0.047 inches. Relatively small bottles within this tolerance range subject the gripping ribs to relatively little compression and deflection, while a relatively large bottle within this range subjects the gripping ribs to substantially the full range of compression and deflection for which they are configured. This dimensioning for interfering engagement is diagrammatically illustrated at "i" in FIG. 6. In addition to providing the desired gripping configuration for the gripping ribs, the truncated conic cross-sectional shape of the gripping ribs facilitates molding of the insert element.

In accordance with the illustrated embodiment, the arcuate face of the insert element, as measured generally from one endmost gripping rib 36 to the other, extends through an arc of approximately 120°. The gripping insert 30 is configured such that the generally arcuate face thereof preferably extends through an arc of about 100° to about 140°.

Not only do the bottle-gripping insert elements 30 provide enhanced gripping engagement with associated bottles, the configuration of each insert, including the manner in which each insert is individually positionable in respective association with one of the pockets of the associated star wheel, greatly facilitates efficient maintenance of the associated capping apparatus. To this end, the insert element 30 includes an arrangement for detachably mounting the insert element in a respective one of the bottle-receiving pockets, which mounting arrangement is illustrated as comprising a pair of ear portions 38 defined by the insert body 32 at generally opposite ends thereof. Each of the ear portions 38 defines an opening for receiving an associated mechanical fastener 40 therethrough, thus facilitating convenient and efficient replacement of the insert elements, as required.

It will also be appreciated that the present gripping insert element is desirably compact in configuration, promoting its versatile application. The invention can readily be employed in those machines which have insufficient space for other types of anti-rotation mechanisms, such as relatively complex (and expensive) mechanical bottle-clamping devices. Once installed, the present insert elements need not be regularly adjusted, as typically required with the heretofore known bottle-gripping flexible belts.

From the foregoing, it will be observed that numerous modifications and variations can be effected without departing from the true spirit and scope of the novel concept of the present invention. It will be understood that no limitation with respect to the specific embodiment illustrated herein is intended or should be inferred. The disclosure is intended to cover, by the appended claims, all such modifications as fall within the scope of the claims.

What is claimed is:

1. A bottle-gripping insert element for use with a bottle-handling apparatus having a rotatable star wheel defining a plurality of bottle-receiving pockets at the periphery thereof, said insert element comprising:

an insert body positionable in respective association with one of said bottle-receiving pockets of said star wheel, said insert body having a generally arcuate, bottle-engaging face against which a bottle is urged and restrained against rotation about its own axis during handling of said apparatus; and means on said insert body for detachably mounting said insert element in a respective one of said bottle-receiving pockets to facilitate replacement of said insert element, wherein said bottle-engaging face defines a plurality of spaced-apart gripping ribs having free end portions engageable with a bottle received in the respective one of said pockets.

2. A bottle-gripping insert element in accordance with claim 1, wherein
said free end portions of said gripping ribs are generally flat-surfaced.

3. A bottle-gripping insert element in accordance with claim 1, wherein
said gripping ribs are generally vertically oriented.

4. A bottle-gripping insert element in accordance with claim 1, wherein
said bottle-engaging face of said insert body is dimensioned for interfering engagement with a bottle positioned thereagainst.

5. A bottle-gripping insert element for use with a bottle-handling apparatus having a rotatable star wheel defining a plurality of bottle-receiving pockets at the periphery thereof, said insert element comprising:

an insert body comprising elastomeric material positionable in respective association with one of said bottle-receiving pockets of said star wheel, said insert body having a generally arcuate, bottle-engaging face defining a plurality of generally vertically extending, spaced-apart gripping ribs, said gripping ribs having free end portions dimensioned for interfering engagement with a bottle, so that a bottle urged against the gripping ribs is restrained against rotation about the axis of the bottle; and means on said insert body for detachably mounting said insert element in a respective one of said bottle-receiving pockets to facilitate replacement of said insert element.

6. A bottle-gripping insert element in accordance with claim 5, wherein
said mounting means comprises a pair of ear portions defined by said insert body at generally opposite ends thereof, each of said ear portions defining an opening for receiving an associated mechanical fastener therethrough.

7. A bottle-gripping insert element in accordance with claim 5, wherein
said generally arcuate face of said insert body extends through an arc of about 100° to about 140°.

8. A bottle gripping insert element in accordance with claim 5, wherein
each of said gripping ribs has a generally truncated conic cross-sectional configuration, with the free end portion thereof being generally flat-surfaced.

9. A bottle-gripping insert element in accordance with claim 5, wherein
said insert body has a generally T-shaped cross-sectional configuration.

* * * * *